United States Patent
Kato et al.

(10) Patent No.: US 8,548,535 B2
(45) Date of Patent: Oct. 1, 2013

(54) MOBILE COMMUNICATION TERMINAL

(75) Inventors: Masataka Kato, Tokyo (JP); Katsunori Takami, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 176 days.

(21) Appl. No.: 12/868,769

(22) Filed: Aug. 26, 2010

(65) Prior Publication Data

US 2011/0183727 A1 Jul. 28, 2011

(30) Foreign Application Priority Data

Jan. 28, 2010 (JP) ................................. 2010-017183

(51) Int. Cl.
- *H04M 3/00* (2006.01)
- *H04M 1/00* (2006.01)
- *H01Q 11/12* (2006.01)
- *H04B 1/16* (2006.01)
- *G08C 17/00* (2006.01)

(52) U.S. Cl.
USPC ..... 455/574; 455/418; 455/127.5; 455/343.2; 370/311

(58) Field of Classification Search
USPC ....... 455/574, 39, 127.1, 127.5, 343.1–343.5, 455/418–420, 466, 515, 517, 550.1, 558, 455/561; 370/311
See application file for complete search history.

(56) References Cited

U.S. PATENT DOCUMENTS

| | | | |
|---|---|---|---|
| 7,162,279 B2 * | 1/2007 | Gupta | 455/574 |
| 2004/0151149 A1 * | 8/2004 | Song et al. | 370/338 |
| 2006/0146769 A1 * | 7/2006 | Patel et al. | 370/338 |
| 2007/0140199 A1 * | 6/2007 | Zhao et al. | 370/338 |

FOREIGN PATENT DOCUMENTS

| | | |
|---|---|---|
| JP | 2003-298493 A | 10/2003 |
| JP | 2005-295000 A | 10/2005 |
| JP | 2006-229580 | 8/2006 |

OTHER PUBLICATIONS

JP Office Action mailed on Mar. 5, 2013 in application No. 2010-017183.

* cited by examiner

*Primary Examiner* — Meless Zewdu
(74) *Attorney, Agent, or Firm* — Maschoff Brennan

(57) ABSTRACT

In one embodiment, a mobile communication terminal is equipped with a first control unit for execution a communication, a second control unit for executing an application program, and a timer unit for generating an interrupt signal when a count value equals a timer value set by the first control unit. The second control unit transmits first information including sleep time to the first control unit and changes to a sleep state. The first control unit sets a timer value in the timer unit in response to the first information and transmits to the second control unit second information for waking the second control unit when the interrupt signal is generated by the timer unit.

15 Claims, 5 Drawing Sheets

MOBILE COMMUNICATION TERMINAL

CROSS-REFERENCE TO RELATED APPLICATION(S)

This application is based upon and claims the benefit of priority to Japanese Patent Application No. 2010-17183, filed Jan. 28, 2010, the entire contents of which are incorporated herein by reference.

FIELD

Embodiments described herein relate generally to a mobile communication apparatus.

BACKGROUND

When two central processing units (CPUs) are provided in a device, the two CPUs may perform functions different from each other, respectively. For example, in the case of a mobile terminal, one CPU may be used as a CPU for communication processing and the other CPU may be used as a CPU for user interface (UI) processing. In such a mobile terminal, when the both CPUs are in a sleep state, as one CPU starts to operate, the other CPU, which is not needed to operate under normal conditions, may start to operate.

As described above, in the mobile terminal including two CPUs, when the both CPUs are in a sleep state, as one CPU starts to operate, the other CPU, which is not needed to operate under normal conditions, starts to operate, so that power may be unnecessarily consumed due to the operation of the other CPU.

DETAILED DESCRIPTION

In general, according to one embodiment, a mobile communication terminal includes a first control unit for executing a communication, a second control unit for executing an application program, and a timer unit for generating an interrupt signal when a count value coincides with a timer value set by the first control unit. The second control unit transmits first information including sleep time to the first control unit and changes to a sleep state. The first control unit sets a timer value in response to the first information to the timer unit and transmits to the second control unit second information for recovering the second control unit when the interrupt signal is generated by the timer unit.

Hereinafter, exemplary embodiments will be described with reference to the accompanying drawings.

Figure 1:
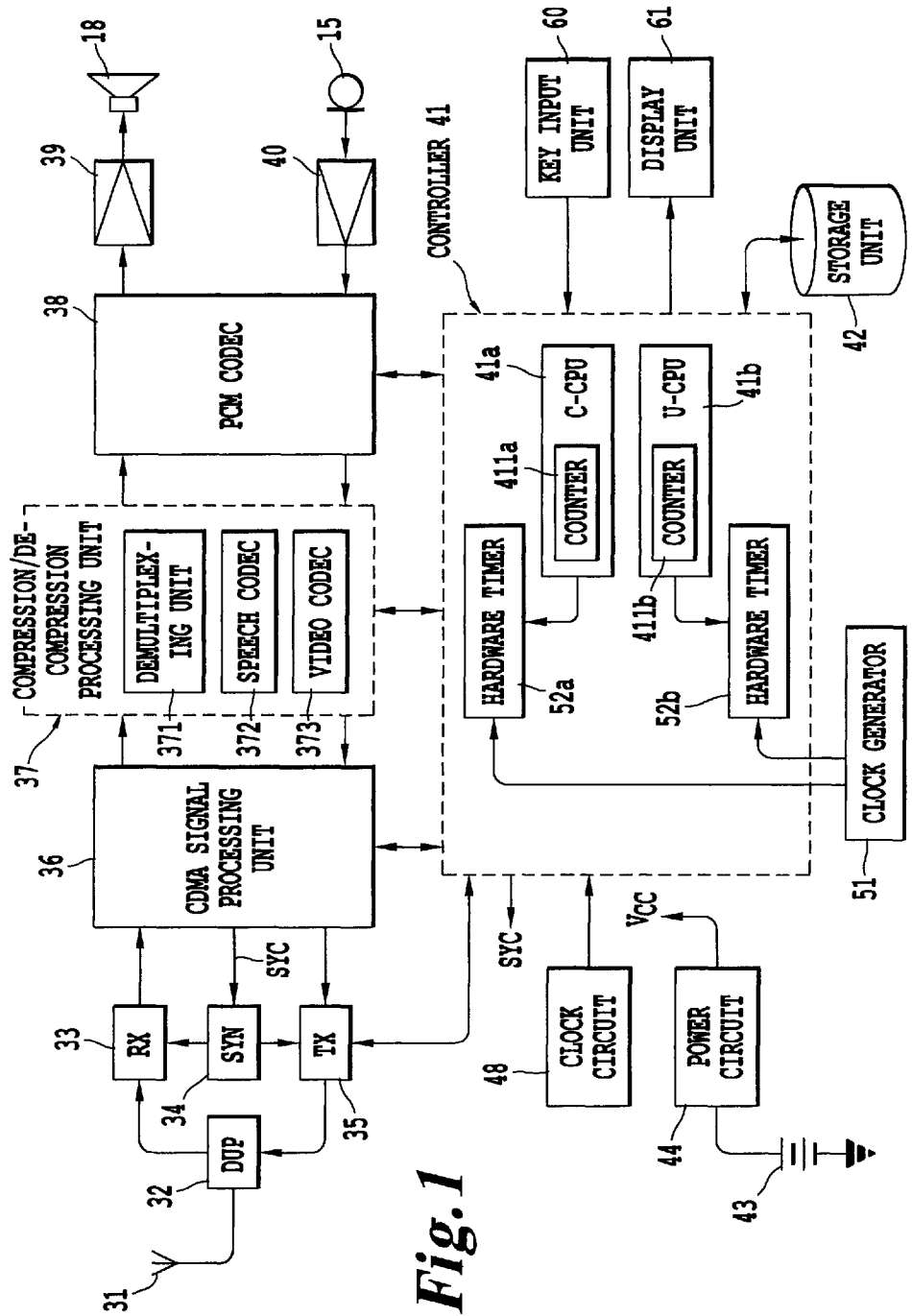
FIG. 1 is a block diagram illustrating the internal configuration of a mobile phone according to one exemplary embodiment of the present advancements.

FIG. 1 illustrates the internal configuration of a mobile phone according to one exemplary embodiment of the present advancements. A radio signal transmitted from a base station (not shown) is received by an antenna 31, and is input to a receiver circuit (RX) 33 through an antenna duplexer (DUP) 32. The receiver circuit 33 mixes the input radio signal with a local oscillation signal input from a frequency synthesizer (SYN) 34 for down-converting to an intermediate frequency signal. Then, the receiver circuit 33 outputs a baseband signal, which is obtained by quadrature-demodulating the down-converted intermediate frequency signal, to a CDMA signal processing unit 36. In addition, the frequency of the local oscillation signal generated by the frequency synthesizer 34 is designated by a control signal SYC output from a controller 41.

The baseband signal input to the CDMA signal processing unit 36 is restored to packet data of a predetermined transmission format through signal processing. Thereafter, the packet data is input to a compression/decompression processing unit 37.

The compression/decompression processing unit 37 includes a digital signal processor (DSP) and the like. When the packet data is received from the CDMA signal processing unit 36, the compression/decompression processing unit 37 divides the packet data into media data such as voice/audio data, image data and control data. The voice/audio data is decoded into a digital voice/audio signal, and the image data is decoded into a digital image signal. The control data is output to the controller 41.

The division into each media data is performed by a demultiplexing unit 371, decoding into the digital voice/audio signal is performed by a speech codec 372, and decoding into the digital image signal is performed by a video codec 373.

For example, when voice communication is performed, voice data is included in packet data and is restored to a digital voice signal by the speech codec 372. Furthermore, when video telephone communication is performed, the packet data is divided into voice data and image data by the demultiplexing unit 371, and thereafter the voice data is restored to a digital voice signal by the speech codec 372 and the image data is restored to a digital image signal by the video codec 373.

The digital voice/audio signal decoded by the speech codec 372 of the compression/decompression processing unit 37 is output to a PCM codec 38. Further, an analog voice/audio signal PCM-decoded by the PCM codec 38 is amplified by a reception amplifier 39 and then is output through a receiver 18. Meanwhile, the digital image signal decoded by the video codec 373 is input to the controller 41 and is displayed on a display unit 61 under the control of the controller 41.

Meanwhile, when voice communication is performed, a speaker's voice input to a microphone 15 is input to a transmission amplifier 40 as an analog voice signal and is amplified by the transmission amplifier 40 up to a predetermined level, and then is PCM-encoded by the PCM codec 38. A digital voice signal generated by the PCM encoding processing is input to the compression/decompression processing unit 37. In addition, when video telephone communication is performed, the compression/decompression processing unit 37 receives the digital image signal output from the controller 41 as well as the digital voice signal. The digital voice signal and the digital image signal are respectively encoded by the speech codec 372 and the video codec 373, and then are multiplexed by the demultiplexing unit 371. Packet data after the multiplexing is transmitted to the signal processing unit 36 from the compression/decompression processing unit 37, and then is transmitted to a base station through a transmitter circuit (TX) 35, the antenna duplexer (DUP) 32 and the antenna 31 as a radio signal.

In addition, the mobile phone 1 includes a clock circuit (timer) 48 that measures the current time.

The controller 41 includes a central processing unit (CPU), a read only memory (ROM), a random access memory (RAM) and the like. The CPU totally controls the mobile phone 1 based on programs stored in the ROM, or an operating system and various application programs, which are loaded to the RAM from a storage unit 42. The RAM stores data and the like required when the CPU performs various processes.

In addition, the controller 41 includes a communication system CPU (hereinafter, referred to as a C-CPU) 41a and a UI (User Interface) system CPU (hereinafter, referred to as a U-CPU) 41b. The C-CPU 41a mainly controls a communication process by using the antenna 31, the DUP 32, the RX 33, the SYN 34, the TX 35, the CDMA signal processing unit 36, the compression/decompression processing unit 37, the PCM codec 38, the reception amplifier 39, the transmission amplifier 40 and the like. Meanwhile, the U-CPU 41b mainly controls a UI process using an input unit, a display unit, the storage unit 42, the clock circuit 47 and the like according to the execution of applications.

The storage unit 42, for example, includes a flash memory, which is an electrically rewritable and erasable non-volatile memory, a hard disc drive (HDD) and the like, and stores various application programs executed by the controller 41 and various data groups.

A power circuit 44 generates a predetermined operating voltage Vcc based on the output of a battery 43, and supplies the operating voltage Vcc to each circuit unit.

In addition, the display unit 61, for example, is an organic EL display or a liquid crystal display (LCD). The mobile phone also includes a key input unit 60 for receiving user input commands.

In addition, in this embodiment, the mobile phone 1 includes two CPUs. However, the mobile phone 1 may include more than three CPUs. As such, the number of CPUs in FIG. 1 is merely exemplary and in no way limits the scope of the present advancements.

The mobile phone 1 performs an intermittent reception operation with a predetermined intermittent reception period, for example, with a period of 5 seconds, in addition to a normal communication operation of communicating with a base station through communication channels in a wireless manner. In the intermittent reception operation, neither voice communication nor data communication is performed, and the C-CPU 41a is activated only when it is necessary to receive a paging signal transmitted, via a paging channel, from the base station, in order to reduce power consumption. That is, when the intermittent reception operation is performed, the C-CPU 41a switches between an active state and an inactive state (i.e., a sleep state).

In addition, when the mobile phone 1 performs the intermittent reception operation, the C-CPU 41a also measures a radio wave state.

Meanwhile, the C-CPU 41a controls change to the sleep state of the U-CPU 41b and recovering from the sleep state of the U-CPU 41b. When the C-CPU 41a is in the sleep state, the U-CPU 41b is also in the sleep state. Further, when the U-CPU 41b changes to the sleep state, the U-CPU 41b informs the C-CPU 41a of expiration timing notification including sleep time information indicating the time (e.g., several seconds) at which the U-CPU 41b recovers from the sleep state or how long the U-CPU 41b sleeps.

When the expiration timing notification is received, the C-CPU 41a sets a hardware timer thereof based on the sleep time information included in expiration timing notification. For example, the C-CPU 41a sets the hardware timer to a time according to an initial intermittent reception period after the sleep time information elapses. In addition, differently from the C-CPU 41a, the U-CPU 41b does not recover from the sleep state with each intermittent reception period, but recovers upon the reception of user manipulation or the expiration of the sleep time information. In the sleep state of the U-CPU 41b, power is not supplied to the U-CPU 41b.

In addition, when the expiration timing notification is received from the U-CPU 41b, the C-CPU 41a sets a timer value in the hardware timer. However, the timer value may be set to a software timer of the C-CPU 41a.

The mobile phone 1 includes a hardware timer 52a used by the C-CPU 41a, and a hardware timer 52b used by the U-CPU 41b.

The hardware timer 52a counts up a count value of a counter 411a based on a clock generated by a clock generator 51. When the count value of the counter 411a reaches a set timer value, the hardware timer 52a generates an interrupt signal and outputs the interrupt signal to the C-CPU 41a.

Meanwhile, the hardware timer 52b counts up the count value of a counter 411b based on the clock generated by the clock generator 51. When the count value reaches a set timer value, the hardware timer 52b generates an interrupt signal and outputs the interrupt signal to the U-CPU 41b.

In addition, when the C-CPU 41a and the U-CPU 41b change to the sleep state, since power supply from the battery is stopped, power supply to the hardware timer 52a and the hardware timer 52b is also stopped. Therefore, when recovering from the sleep state by an interrupt from a clock circuit (real-time clock) 48, the C-CPU 41a calibrates the counter 411a based on time information output from the clock circuit 48. Meanwhile, when recovering from the sleep state by the interrupt signal from the C-CPU 41a, the U-CPU 41b calibrates the counter 411b based on the count value of the counter 411a which is notified from the C-CPU 41a. In addition, the timer also includes a software timer, which is performed by an operating system (OS) or an application program executed by the C-CPU 41a or the U-CPU 41b, in addition to the above-described hardware timer. For example, when the software timer detects that a timer value set by a user program reaches the count value by referring to the count value of the counter 411a or the counter 411b, the software timer notifies the user program that the timer value expired. The C-CPU 41a or the U-CPU 41b may determine whether the timer has been expired based on the time information output from the clock circuit 48.

In addition, even when using the software timer, when the C-CPU 41a or the U-CPU 41b is in the sleep state, the timer operation of the software timer provided in the CPU in the sleep state is stopped. Therefore, similarly to the hardware timer, when the set timer value coincides with or exceeds the count value, it is determined that the timer has been expired with reference to the count value of the counter 411a or the counter 411b, which is calibrated when the C-CPU 41a or the U-CPU 41b recovers from the sleep state.

Meanwhile, in relation to the timer expiration timing of the hardware timer 52b and the software timer of the U-CPU 41b, a predetermined delay (e.g., maximum 5 seconds) may be permitted. The delay, for example, is set based on the intermittent reception period of the mobile phone 1. According to the embodiment as described above, the recovering timing from the sleep state of the U-CPU 41b is made correspond to the timing, at which the C-CPU 41a recovers from the sleep state in order to perform the intermittent reception operation, by using the permitted delay. In addition, the C-CPU 41a interrupts the U-CPU 41b at the timing based on the sleep time information notified from the U-CPU 41b. As a result, it is possible to reduce power consumption since the U-CPU 41b is not activated at an unnecessary timing. Moreover, interruption from the C-CPU 41a to the U-CPU 41b is performed by a signal called start notification.

Hereinafter, the operation of the mobile phone 1 according to the embodiment will be described.

Figure 2:
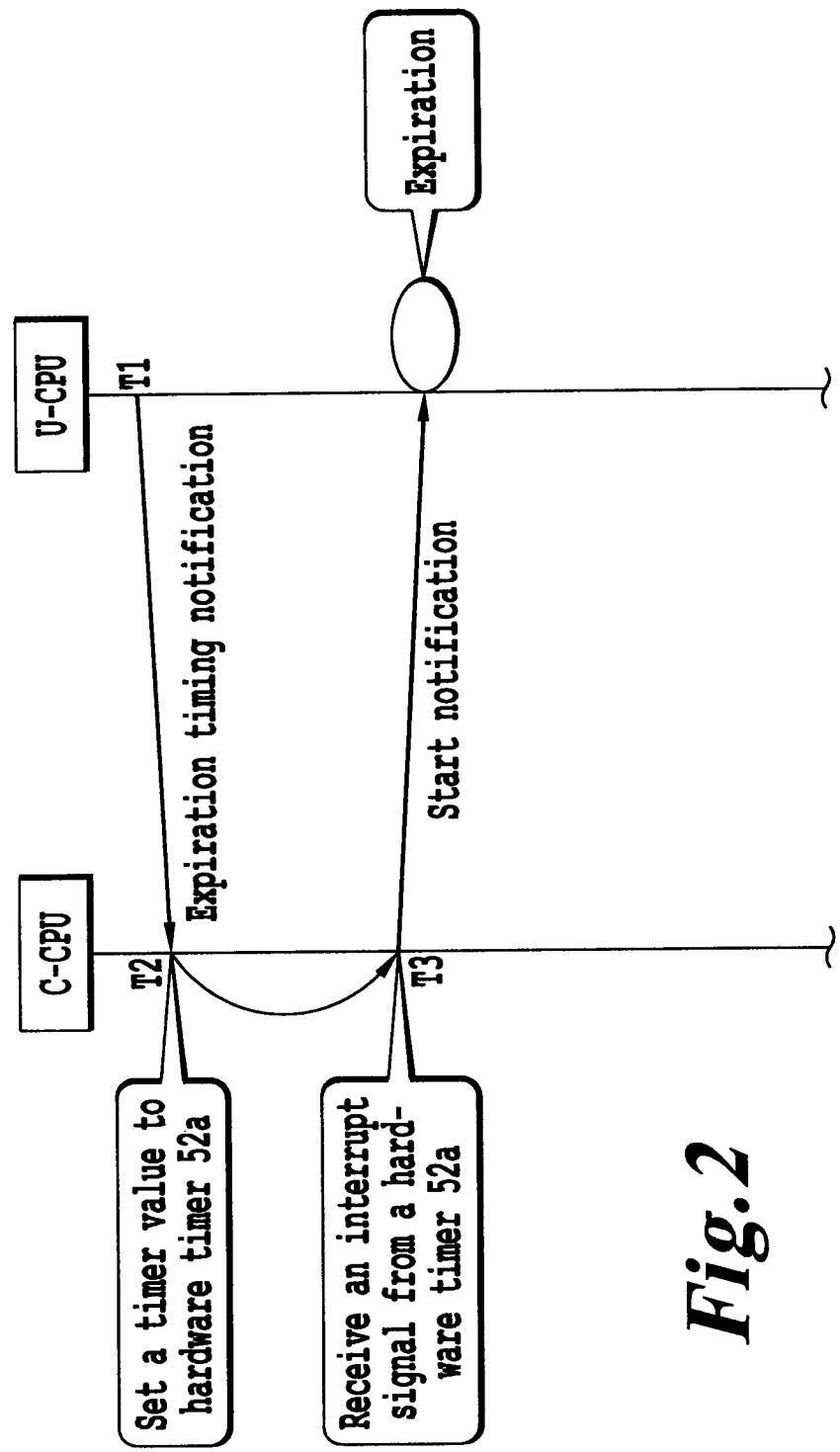
FIG. 2 is a sequence diagram illustrating one example of a timer operation performed between two CPUs according to one exemplary embodiment of the present advancements.

FIG. 2 is a sequence diagram illustrating one example of a timer operation performed by the C-CPU 41a and the U-CPU 41b.

As shown in FIG. 2, when a change request to the sleep state is received from an application program, the U-CPU 41b transmits expiration timing notification including the sleep time information to the C-CPU 41a at T1, and sets an expiration callback flag of a shared memory of the controller 41 to "TRUE". Then, the U-CPU 41b changes to the sleep state. The sleep time information included in the expiration timing notification, for example, is a time indicating the recovering timing from the sleep state which is indicated by the application program.

When the expiration timing notification is received from the U-CPU 41b, the C-CPU 41a sets the timer value in the hardware timer 52a based on the sleep time information included in the expiration timing notification at T2. Then, the hardware timer 52a monitors whether the timer has been expired by comparing the count value of the counter 411a with the set timer value. During the monitoring, when the C-CPU 41a changes to the sleep state, the C-CPU 41a performs the intermittent reception operation of recovering from the sleep state with the intermittent reception period. During the intermittent reception operation, since the C-CPU 41a calibrates the counter 411a based on the time information output from the clock circuit 48 whenever starting to operate at the intermittent reception period, the hardware timer 52a confirms whether the timer has been expired by comparing the count value after the calibration with the set timer value.

In addition, when the C-CPU 41a performs the intermittent reception operation, the C-CPU 41a recovers from the sleep state at the intermittent reception period (e.g., 5 seconds). The recovering is performed by instructing the clock circuit 48 to interrupt the C-CPU 41a in 5 seconds when the C-CPU 41a changes to the sleep state. When the C-CPU 41a receives an interrupt signal from the clock circuit 48 upon the expiration of the timer and starts to operate, the C-CPU 41a checks whether a paging signal destined to the C-CPU 41a is transmitted from the base station. When there is no paging signal destined to the C-CPU 41a, the C-CPU 41a again sets the timer value of 5 seconds to the clock circuit 48 and changes to the sleep state.

Thereafter, when the C-CPU 41a is activated at the intermittent reception period, if the hardware timer 52a detects that the count value of the counter 411a coincides with or exceeds the set timer value, the C-CPU 41a changes from the intermittent reception operation to the normal communication operation capable of receiving a radio signal from the base station at any time, and outputs start notification upon the expiration of the timer to the U-CPU 41b at T3. In addition, although the timer has been expired, when the expiration callback flag set in the shared memory of the controller 41 by the C-CPU 41a is "FALSE", the C-CPU 41a does not transmit the start notification to the U-CPU 41b.

It is assumed that the timer value, which is set in the hardware timer 52a according to the expiration timing notification from the U-CPU 41b, is 30 seconds. The C-CPU 41a starts to operate with the intermittent reception period of 5 seconds as described above. However, as long as the hardware timer 52a does not detect the expiration of the timer value of 30 seconds, the C-CPU 41a does not transmit the start notification to the U-CPU 41b. By the way, since the C-CPU 41a starts to operate with the intermittent reception period of 5 seconds, the timing of the intermittent reception period may be deviated from the sleep time information of 30 seconds which is notified through the expiration timing notification. Therefore, the U-CPU 41b may not receive the start notification at the timing of 30 seconds which is notified by the expiration timing notification. However, since the C-CPU 41a detects the expiration of the timer at the intermittent reception period immediately after the sleep time information of 30 seconds elapses, the U-CPU 41b receives the start notification from the C-CPU 41a within the delay of 5 seconds at maximum, and may recover from the sleep state.

In addition, when the U-CPU 41b recovers from the sleep state in response to the interrupt by the start notification, the U-CPU 41b sets the expiration callback flag of the shared memory of the controller 41 to "FALSE". Here, the C-CPU 41a may wrongly determine that the timer set by the U-CPU 41b has expired after the U-CPU 41b recovered. However, since the callback flag is set to "FALSE", no start notification is transmitted from the C-CPU 41a even if the C-CPU 41a determines that the timer has been expired for some reason, when the C-CPU 41a starts to operate at the intermittent reception period.

Figure 3:
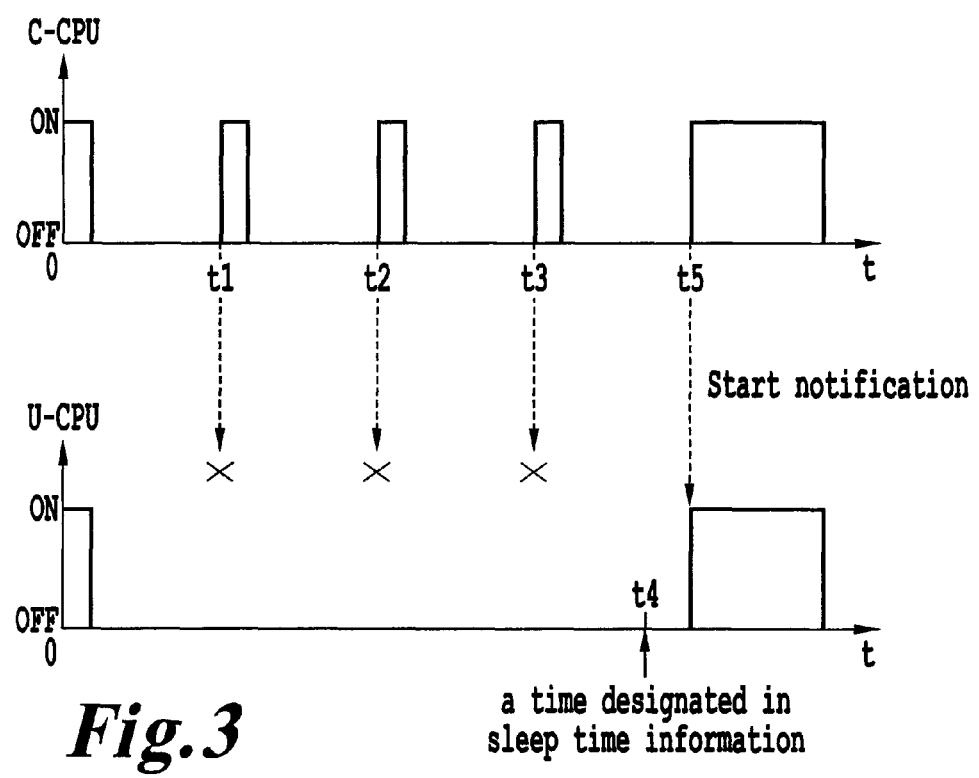
FIG. 3 is diagram illustrating one example of processing at the time of timer expiration according to one exemplary embodiment of the present advancements.

FIG. 3 is a diagram illustrating a timer expiration process when the mobile phone 1 exists in an area where the mobile phone 1 can communicate with a base station, and performs the intermittent reception operation.

As shown in FIG. 3, the C-CPU 41a is activated by the clock circuit 48 every intermittent reception period for receiving the paging signal transmitted from the base station. For example, the C-CPU 41a is activated with each intermittent reception period indicated by times t1, t2, t3 and t5 from the clock circuit 48. At this time, since the C-CPU 41a sets the timer value in the hardware timer 52a based on the sleep time information included in the expiration timing notification from the U-CPU 41b, the C-CPU 41a determines whether the timer has been expired by comparing the count value of the counter 411a with the timer value in accordance with the intermittent reception period.

When the timer set based on the sleep time information is not expired, the C-CPU 41a does not transmit the start notification to the U-CPU 41b although the C-CPU 41a is activated at the intermittent reception period. For example, at the times t1, t2 and t3 of FIG. 3, since it has not reached a time t4 indicated by the sleep time information in the expiration timing notification from the U-CPU 41b, the start notification is not transmitted from the C-CPU 41a to the U-CPU 41b.

Meanwhile, when the C-CPU 41a has been activated at the intermittent reception period, if it is detected that the timer set based on the sleep time information is expired by the C-CPU 41a, the start notification is transmitted to the U-CPU 41b. That is, as shown in FIG. 3, when the C-CPU 41a is activated at t5, since the count value of the hardware timer 52a has already exceeded the time t4 indicated by the sleep time information, the start notification is transmitted from the C-CPU 41a to the U-CPU 41b.

Upon the reception of the start notification, the U-CPU 41*b* recovers from the sleep state and executes the application program. In addition, upon the transmission of the start notification, the C-CPU 41*a* also changes to the normal communication operation from the intermittent reception operation.

In the above description, when the U-CPU 41*b* changes to the sleep mode, the hardware timer 52*b* does not operate because power is not supplied from the battery. However, for example, in the case of a radio wave off-mode such as an airplane mode in which the mobile phone 1 does not transmit/receive a radio signal, the C-CPU 41*a* does not perform the intermittent reception operation. As a result, the C-CPU 41*a* may not transmit the start notification to the U-CPU 41*b*. Therefore, power may be continuously supplied to the hardware timer 52*b* even when the U-CPU 41*b* changes to the sleep state. In this case, even if the C-CPU 41*a* may not transmit the start notification in the radio wave off-mode, it is possible to avoid the condition in which the U-CPU 41*b* does not recover from the sleep state.

Hereinafter, the timer operation when the mobile phone 1 is in the radio wave off-mode will be described with reference to FIGS. 4 and 5.

Figure 4:
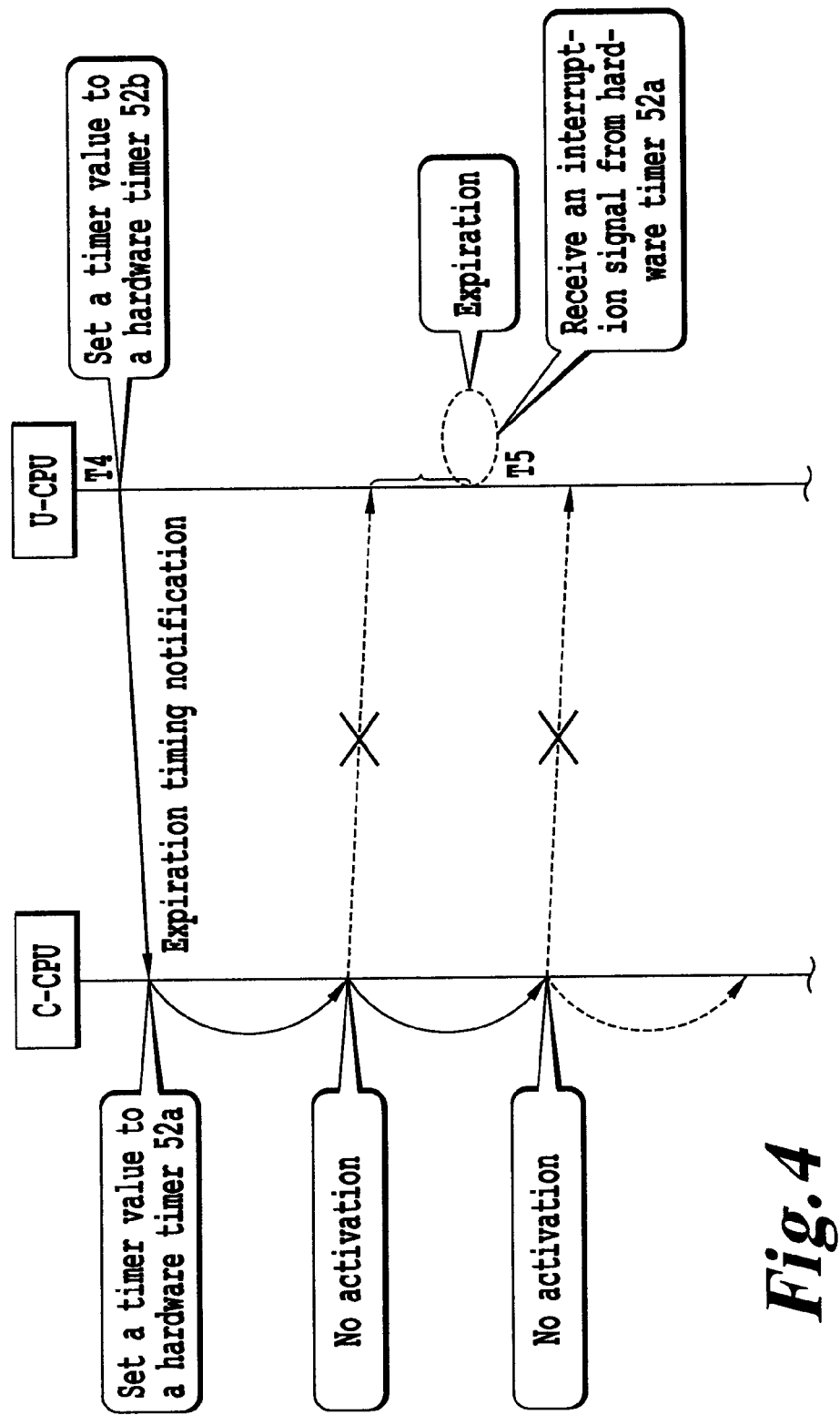
FIG. 4 is a sequence diagram illustrating another example of a timer operation performed between two CPUs according to one exemplary embodiment of the present advancements.

FIG. 4 is a sequence diagram illustrating one example of the timer operation performed by the C-CPU 41*a* and the U-CPU 41*b*.

As shown in FIG. 4, at T4, the U-CPU 41*b* transmits the expiration timing notification including the sleep time information to the C-CPU 41*a* based on the change request to the sleep state from the application program, and sets the expiration callback flag of the shared memory of the controller 41 to "TRUE". In addition, at this timing, the U-CPU 41*b* sets a value, which is obtained by adding a predetermined margin (e.g., 5 seconds) to the sleep time information, in the hardware timer 52*b* as the timer value. Thereafter, the U-CPU 41*b* changed to the sleep state.

In this case, since the C-CPU 41*a* is being set to the radio wave off-mode, the C-CPU 41*a* may not transmit the start notification, based on the expiration timing notification received from the U-CPU 41*b*, to the U-CPU 41*b*.

However, at T5, since the timer value set in the hardware timer 52*b* coincides with the count value of the counter 411*b*, the hardware timer 52*b* interrupts the U-CPU 41*b*, so that the U-CPU 41*b* recovers from the sleep state. As described above, even if the mobile phone 1 is in the radio wave off-mode, the U-CPU 41*b* can perform processing in response to the interrupt from the hardware timer 52*b*.

In the above description, regardless of whether the mobile phone 1 is in the radio wave off-mode, the U-CPU 41*b* transmits the expiration timing notification to the C-CPU 41*a* in response to the request of the application program, and sets the value, which is obtained by adding the predetermined margin to the sleep time information included in the expiration timing notification, in the hardware timer 52*b* as the timer value.

Consequently, when the mobile phone 1 is not in the radio wave off-mode, the U-CPU 41*b* receives the start notification from the C-CPU 41*a* upon the expiration of the timer based on the sleep time information. Therefore, when the U-CPU 41*b* receives the start notification, the timer value set in the hardware timer 52*b* is invalidated, so that a meaningless interrupt is not notified from the hardware timer 52*b* to the U-CPU 41*b*.

Figure 5:
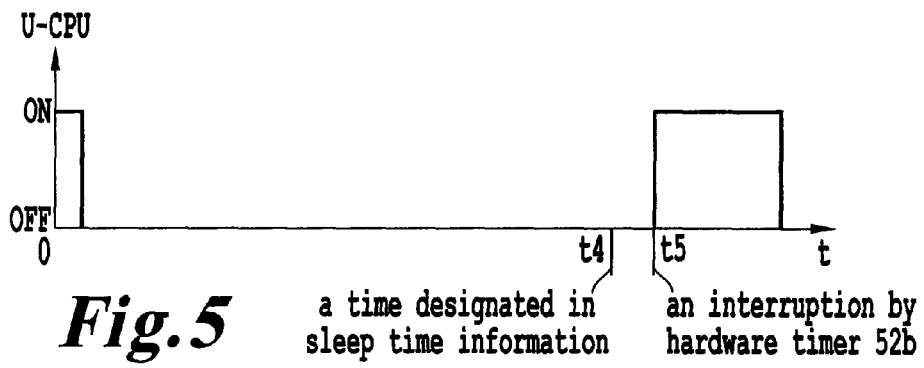
FIG. 5 is a diagram illustrating another example of processing at the time of timer expiration according to one exemplary embodiment of the present advancements.

FIG. 5 is a diagram explaining a timer expiration process when the mobile phone 1 is in the radio wave off-mode.

As described above, when the mobile phone 1 is in the radio wave off-mode, since a radio signal is not exchanged between the mobile phone 1 and the base station, the C-CPU 41*a* does not perform the intermittent reception operation in the sleep state. Therefore, a timer operation is performed based on the timer value set by the U-CPU 41*b* in the hardware timer 52*b*, and the hardware timer 52*b* detects the expiration of the timer when the count value of the counter 411*b* coincides with the timer value t5 which is obtained by adding the predetermined margin to the sleep time information the time t4. In response to the detection, at t5, the hardware timer 52*b* interrupts the U-CPU 41*b*, so that the U-CPU 41*b* can recover from the sleep state and execute the application program.

As described above, regardless of whether the mobile phone 1 is in the radio wave off-mode, the U-CPU 41*b* never be recovered from the sleep state at the irrelevant timing other than the timing designated by the application program.

In addition, in the above description, when the mobile phone 1 is in the radio wave off-mode, the hardware timer 52*b* interrupts the U-CPU 41*b*, so that the U-CPU 41*b* can recover from the sleep state. However, it may be possible for the U-CPU 41*b* to recover from the sleep state by using the hardware timer 52*a* of the C-CPU 41*a*.

In such a case, according to the circuit configuration of the mobile phone 1, even when the C-CPU 41*a* has changed to the sleep state, power is continuously supplied to the hardware timer 52*a*. Further, when the mobile phone 1 is in the radio wave off-mode, if the expiration timing notification is received from the U-CPU 41*b*, the C-CPU 41*a* sets the sleep time information t4 derived from the received expiration timing notification in the hardware timer 52*a* as the timer value.

Thereafter, although the C-CPU 41*a* has changed to the sleep state, the hardware timer 52*a* continues the timer operation, and interrupts the C-CPU 41*a* when the count value of the counter 411*a* coincides with the timer value. As a result, the C-CPU 41*a* transmits the start notification to the U-CPU 41*b*. Consequently, even if the mobile phone 1 is in the radio wave off-mode and the C-CPU 41*a* does not perform the intermittent reception operation, the U-CPU 41*b* may start to operate at the timing requested by the application program.

Figure 6:
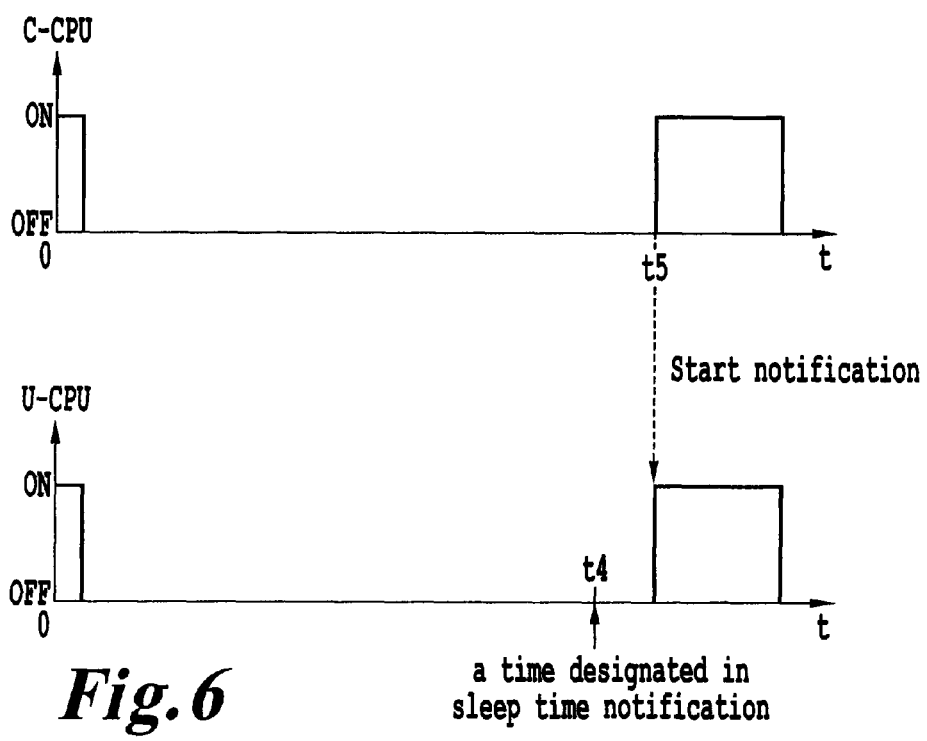
FIG. 6 is a diagram illustrating further another example of processing at the time of timer expiration according to one exemplary embodiment of the present advancements.

FIG. 6 is a diagram explaining the timer expiration process using the hardware timer 52*a* when the C-CPU 41*a* changes to the sleep state.

As shown in FIG. 6, even if the C-CPU 41*a* changes to the sleep state and does not perform the intermittent reception operation, the start notification is transmitted from the C-CPU 41*a* to the U-CPU 41*b* upon the expiration of the timer value, at t5, set in the hardware timer 52*a* based on the expiration timing notification received from the U-CPU 41*b*, so that the U-CPU 41*b* can recover from the sleep state.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

What is claimed is:

1. A mobile communication terminal comprising:
   a first control unit configured to execute a communication;
   a second control unit configured to execute an application program; and
   a timer unit configured to generate an interrupt signal when a count value equals a timer value set by the first control unit, wherein, when a request for changing the second control unit to a sleep state is received from the application program, the second control unit transmits first information containing a sleep time to the first control unit and changes to a sleep state, the sleep time indicating a recovering timing for the second control unit to wake up from the sleep state, and the first control unit sets the timer value in the timer unit to the sleep time based on the first information and transmits, to the second control unit, second information indicating a request for waking the second control unit when the interrupt signal is generated by the timer unit, and wherein, each time the first control unit is activated from a sleep state at intervals of a predetermined intermittent reception period, the first control unit determines whether the sleep time based on the first information expires, and the first control unit transmits the second information to the second control unit only when the sleep time is determined as expiring, and does not transmit the second information to the second control unit when the sleep time is determined as not expiring.

2. The mobile communication terminal according to claim 1, wherein the second control unit transmits the first information when the application program instructs the second control unit to change to the sleep state.

3. The mobile communication terminal according to claim 1, wherein the first control unit calibrates the count value of the timer unit when the first control unit is activated during the intermittent reception operation.

4. The mobile communication terminal according to claim 3, wherein the timer unit determines whether the count value equals the timer value set by the first control unit after the first control unit calibrates the count value.

5. The mobile communication terminal according to claim 1, wherein the timer unit generates the interrupt signal when the timer unit detects that the count value equals or exceeds the timer value.

6. A mobile communication terminal comprising:
first control means for executing a communication;
second control means for executing an application program; and
timer means for generating an interrupt signal when a count value equals a timer value set by the first control unit,
wherein, when a request for changing the second control means to a sleep state is received from the application program, the second control means transmits first information containing a sleep time to the first control means and changes to a sleep state, the sleep time indicating a recovering timing for the second control means to wake up from the sleep state, and
the first control means sets the timer value in the timer means to the sleep time based on the first information and transmits to the second control means second information indicating a request for waking the second control unit when the interrupt signal is generated by the timer means, and
wherein, each time the first control means is activated from a sleep state at intervals of a predetermined intermittent reception period, the first control means determines whether the sleep time based on the first information expires, and the first control means transmits the second information to the second control means only when the sleep time is determined as expiring, and does not transmit the second information to the second control unit when the sleep time is determined as not expiring.

7. The mobile communication terminal according to claim 6, wherein the second control means transmits the first information when the application program instructs the second control means to change to the sleep state.

8. The mobile communication terminal according to claim 7, wherein the first control means calibrates the count value of the timer means when the first control means is activated during the intermittent reception operation.

9. The mobile communication terminal according to claim 8, wherein the timer means determines whether the count value equals the timer value set by the first control means after the first control means calibrates the count value.

10. The mobile communication terminal according to claim 6, wherein the timer means generates the interrupt signal when the timer means detects that the count value equals or exceeds the timer value.

11. A method of controlling control unit sleep states in a mobile communication terminal, comprising:
transmitting from a second control unit to a first control unit, a first information including a sleep time;
changing the second control unit into a sleep state, the sleep time indicating a recovering timing for the second control unit to wake up from the sleep state;
setting, by the first control unit, a timer value in a timer unit in response to the first information received from the second control unit; and
transmitting from the first control unit to the second control unit, a second information indicating a request to wake the second control unit when an interrupt signal is generated by the timer unit,
wherein, each time the first control unit is activated from a sleep state at intervals of a predetermined intermittent reception period, the first control unit determines whether the sleep time based on the first information expires, and the first control unit transmits the second information to the second control unit only when the sleep time is determined as expiring, and does not transmit the second information to the second control unit when the sleep time is determined as not expiring.

12. The method according to claim 11, further comprising:
transmitting, from the second control unit to the first control unit, the first information when the application program instructs the second control unit to change to the sleep state.

13. The method according to claim 11, further comprising:
calibrating, at the first control unit, the count value of the timer unit when the first control unit is activated during the intermittent reception.

14. The method according to claim 13, further comprising:
determining, at the timer unit, whether the count value equals the timer value set by the first control unit after the first control unit calibrates the count value.

15. The method according to claim 11, further comprising:
generating, at the timer unit, the interrupt signal when the timer unit determines that the count value equals or exceeds the timer value.

* * * * *